(12) United States Patent
Endo

(10) Patent No.: US 12,703,241 B2
(45) Date of Patent: Aug. 11, 2026

(54) IN-VEHICLE FUEL TANK DEVICE AND UTILITY VEHICLE

(71) Applicant: Kubota corporation, Osaka (JP)

(72) Inventor: Yusuke Endo, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/619,551

(22) Filed: Mar. 28, 2024

(65) Prior Publication Data

US 2024/0343110 A1 Oct. 17, 2024

(30) Foreign Application Priority Data

Apr. 17, 2023 (JP) ................................ 2023-067251

(51) Int. Cl.

*B60K 15/035* (2006.01)
*B60K 15/01* (2006.01)
*B60K 15/073* (2006.01)
*F02M 37/00* (2006.01)
*F02M 37/04* (2006.01)
*B60K 15/03* (2006.01)

(52) U.S. Cl.

CPC ........ *B60K 15/03504* (2013.01); *B60K 15/01* (2013.01); *B60K 15/073* (2013.01); *F02M 37/007* (2013.01); *F02M 37/0088* (2013.01); *F02M 37/04* (2013.01); *B60K 2015/03144* (2013.01); *B60K 2015/03243* (2013.01); *B60K 2015/03256* (2013.01)

(58) Field of Classification Search

CPC ............. Y10T 137/6004; B60K 15/06; B60K 15/077; B60K 2015/0777; B60K 2015/03105; F02M 37/106

USPC .......................................................... 123/516

See application file for complete search history.

(56) References Cited

U.S. PATENT DOCUMENTS 708,883 A * 9/1902 Hodgens ............ G05D 16/0663 137/505.33
2003/0019529 A1* 1/2003 Reinelt .................. B60K 15/04 137/592
2007/0169975 A1* 7/2007 Kubota ................ F02M 37/103 180/69.4
2010/0206272 A1* 8/2010 Ishida .................. F02M 25/089 123/520
2016/0201819 A1 7/2016 Hedevang
2016/0221436 A1* 8/2016 Lindlbauer ............... F17D 5/02
2019/0128227 A1* 5/2019 Amano ................ F02M 37/007

(Continued)

FOREIGN PATENT DOCUMENTS

CN 115247618 A 10/2022
JP 659117 U 8/1994
JP 7125550 A 5/1995

(Continued)

*Primary Examiner* — Logan M Kraft
*Assistant Examiner* — Joshua Campbell
(74) *Attorney, Agent, or Firm* — The Webb Law Firm

(57) ABSTRACT

An in-vehicle fuel tank device includes a main tank including a top portion, a side portion, and a bottom portion; and a first opening and a second opening each disposed in the top portion and serving as a breather; a first pipe connected to the first opening; a second pipe connected to the second opening; a merge section at which the first pipe and the second pipe merge with each other; a merge pipe connected to the merge section; and a common cutoff valve on the merge pipe.

10 Claims, 4 Drawing Sheets

(56) References Cited

U.S. PATENT DOCUMENTS

2022/0340002 A1* 10/2022 Thompson ........... B60K 15/063
2022/0341377 A1 10/2022 Dudar

FOREIGN PATENT DOCUMENTS

JP 2001050129 A * 2/2001
JP 2002155819 A 5/2002
JP 2010190152 A 9/2010
JP 2016534286 A 11/2016
JP 202125457 A 2/2021

* cited by examiner 10
11
12
13
14
15
21
22
23
U
D
B
F 8
6
60
61
59
57
58
55
52
50B(50)
70
7
53b
4
53d
IV
IV
53c
51
50A(50)
53a
54
56
53
5
52

IN-VEHICLE FUEL TANK DEVICE AND UTILITY VEHICLE

CROSS-REFERENCE TO RELATED APPLICATION

This application claims priority to Japanese Patent Application No. 2023-067251 filed Apr. 17, 2023, the disclosure of which is hereby incorporated by reference in its entirety.

BACKGROUND OF THE INVENTION

Field of the Invention

The present invention relates to an in-vehicle fuel tank device configured to supply fuel to a vehicle engine and a utility vehicle including the in-vehicle fuel tank device.

Description of Related Art

An in-vehicle fuel tank includes a fuel pump, a breather pipe, and a cutoff valve. The fuel pump is configured to supply fuel to an engine. The breather pipe serves for air bleeding during supply of gasoline into a tank. The cutoff valve serves to discharge vaporized gasoline from the tank.

Patent Literature 1, for example, discloses in FIGS. 5 and 6 a tank system including two tanks each configured to store fuel, two breather pipes for air bleeding during supply of gasoline, two cutoff valves provided for the respective tanks, and an evaporator pipe connected to the cutoff valves. Opening a cutoff valve allows evaporated fuel to be guided through the evaporator pipe to a canister. Closing a cutoff valve prevents fuel from flowing from the corresponding tank into the evaporator pipe. Patent Literature 1 also discloses in FIGS. 1 and 2 a tank system including two tanks each configured to store fuel, a single cutoff valve provided for one of the tanks, an evaporator pipe connected to the cutoff valve, and a breather pipe connected to the tanks. This tank system, which includes a single cutoff valve for one of the tanks, needs to have a breather pipe opening so positioned as to prevent the surface of fuel in the tank from coming into contact with the cutoff valve as a result of the surface becoming inclined in response to a change in the orientation of the tank.

Patent Literature 1

Japanese Unexamined Patent Application Publication, Tokukai, No. 2021-25457

The tank systems of Patent Literature 1 each include one or two cutoff valves at an opening(s) of an evaporator pipe provided for the top portion of the tank(s). Using two or more evaporator pipes for a single tank will require use of two or more cutoff valves to meet the strict evaporative control regulations. Further, to prevent fuel from flowing out in response to the vehicle rolling over, a single tank will require two or more evaporator pipe openings or breather openings (the evaporator pipe doubles as a breather pipe). Using more cutoff valves as such leads to higher costs.

SUMMARY OF THE INVENTION

It is an object of the present invention to provide an in-vehicle fuel tank device including fewest possible cutoff valves for two or more openings with a breather function and a utility vehicle including the in-vehicle fuel tank device.

An in-vehicle fuel tank device as an embodiment of the present invention includes: a main tank including a top portion, a side portion, and a bottom portion; a first opening and a second opening each disposed in the top portion and serving as a breather; a first pipe connected to the first opening; a second pipe connected to the second opening; a merge section at which the first pipe and the second pipe merge with each other; a merge pipe connected to the merge section; and a common cutoff valve on the merge pipe.

The above configuration involves more than one opening serving as a breather and more than one pipe connecting the openings. This inhibits fuel from flowing out of the tank due to an unlikely rollover of the vehicle. Further, the above configuration, which involves more than one opening, involves a common cutoff valve on the merge pipe connected to the merge section of the pipes connected to the openings. This reduces costs as compared to a configuration involving one or more cutoff valves for the respective openings.

The in-vehicle fuel tank device may, as an embodiment of the present invention, further include: an adapter that allows the common cutoff valve to be independently attached to and detached from the merge pipe. With this configuration, the common cutoff valve is detachably attached, with the adapter in-between, to the merge pipe extending outside the tank. This advantageously allows the common cutoff valve to be detached easily from the merge pipe for maintenance and inspection.

The in-vehicle fuel tank device may, as an embodiment of the present invention, further include: a canister connected to the merge pipe. This configuration allows the first pipe, the second pipe, and the merge pipe to each function as an evaporator pipe as well, and allows the canister to collect fuel vapor generated in the fuel tank.

The in-vehicle fuel tank device may, as another embodiment of the present invention, be further configured such that the merge pipe has an end exposed to outside. This configuration allows the inside of the tank to be connected to its outside through the first pipe, the second pipe, and the merge pipe, and thereby inhibits the internal pressure of the tank from being changed when the vehicle is refueled, tilted, or abruptly accelerated or decelerated.

The in-vehicle fuel tank device may, as an embodiment of the present invention, further include: an engine; and a fuel pump configured to supply fuel to an engine, wherein the main tank includes a sub tank in a form an upwardly open depression in the bottom portion thereof, and the fuel pump has a suction port in the sub tank. This configuration allows the fuel pump to have a suction port at the deepest portion, and thereby allows the fuel pump to supply fuel to the engine even when the vehicle is tilted largely.

The present invention may be embodied not only as an in-vehicle fuel tank device but also as a utility vehicle including the in-vehicle fuel tank device. Utility vehicles travel on, for example, rough terrain, rocky soil, lumpy roads, or farmland other than normal roads, and likely enjoy the benefits of the above features and effects of the in-vehicle fuel tank device according to the present invention.

DESCRIPTION OF THE INVENTION

Figure 1:
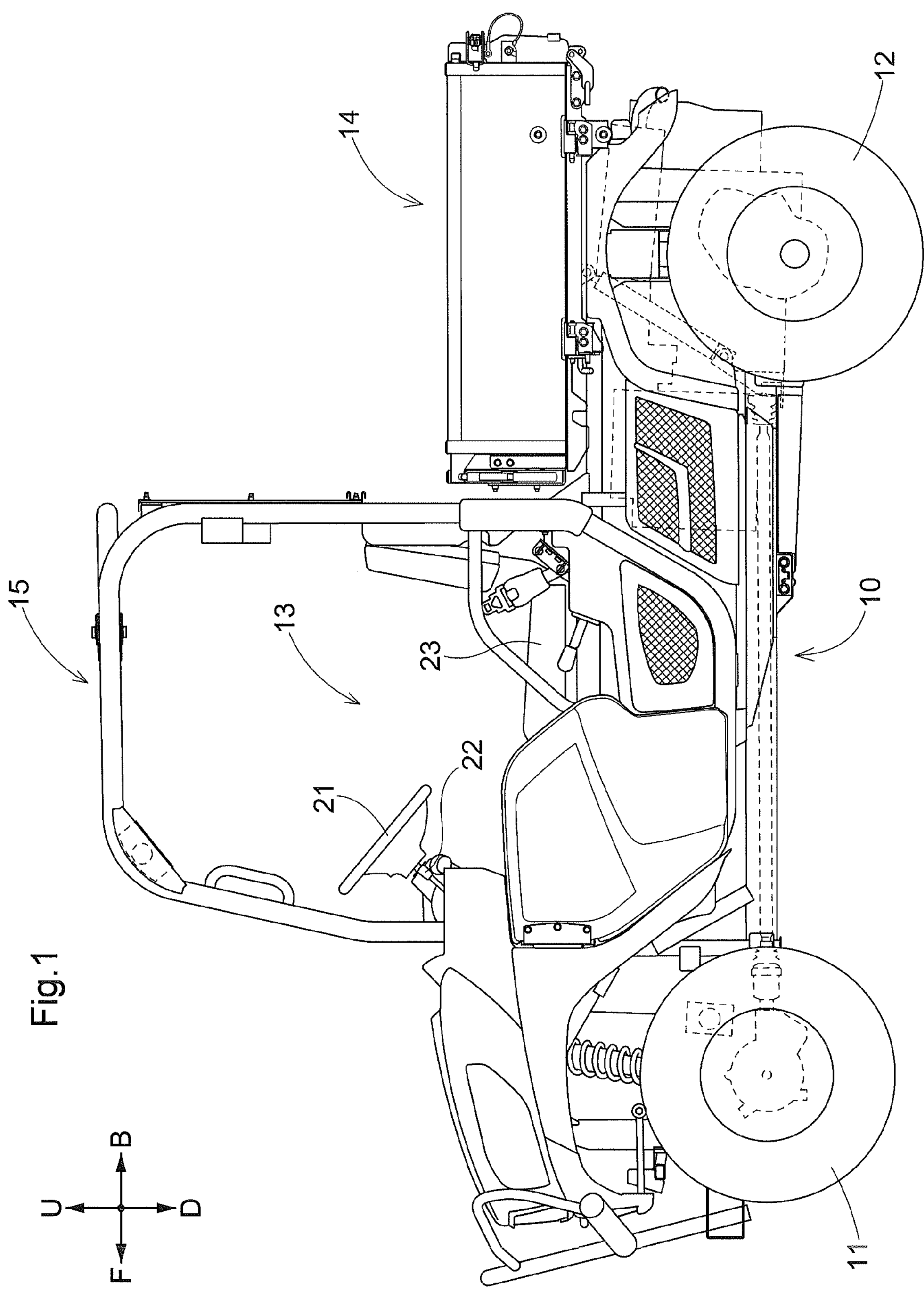
FIG. 1 is a side view of a utility vehicle including an in-vehicle fuel tank device.
Figure 2:
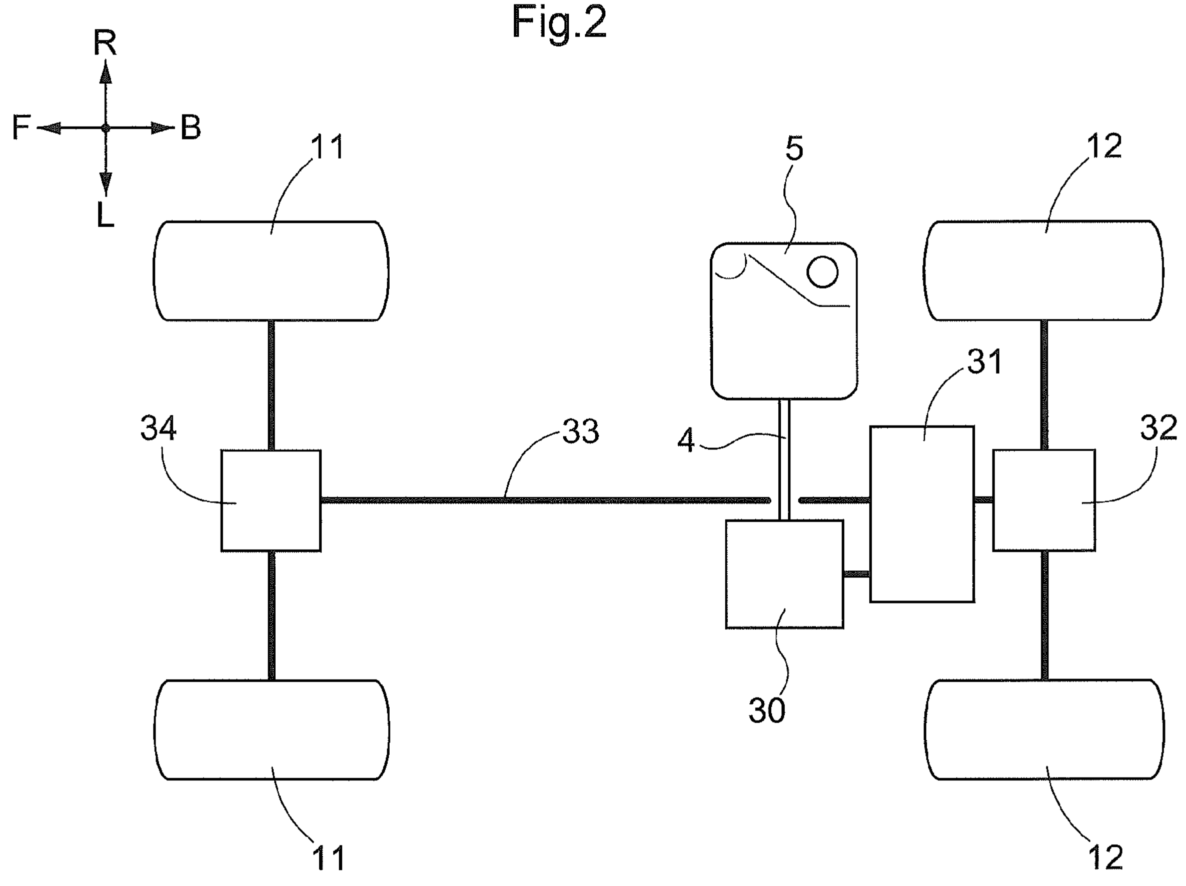
FIG. 2 is a diagram of the motive power system of a utility vehicle as viewed from above.

The description below deals with a utility vehicle including an in-vehicle fuel tank device as an embodiment of the present invention with reference to drawings. FIG. 1 is a side view of the utility vehicle. FIG. 2 is a diagram of the motive power system and fuel system of the utility vehicle as viewed from above. Unless otherwise stated, arrows F and B in FIGS. 1 and 2 indicate the front and back sides, respectively, in the front-back direction of the body (that is, the travel direction); arrows L and R in FIG. 2 indicate the left and right sides, respectively, in the transverse direction of the body; and arrows U and D in FIG. 1 indicate the upward and downward sides, respectively, in the vertical direction of the body (that is the direction of the height from the ground).

The utility vehicle is configured to serve various purposes such as cargo transportation and off-road travel. The utility vehicle includes a body 10 as a frame structure, a pair of left and right drivable and turnable front wheels 11, and a pair of left and right drivable rear wheels 12. The utility vehicle also includes a driver section 13, a carrier box 14, and a roll-over protection system (ROPS) 15. The driver section 13 is disposed above a central portion of the body 10 and configured to accommodate a driver for driving the utility vehicle. The carrier box 14 is disposed above a back portion of the body 10 and configured to receive and dump a cargo. The ROPS 15 defines the driver section 13.

The driver section 13 includes a steering wheel 21 for turning the front wheels 11, a shift lever 22 for shifting gears, a driver's seat 23 for an occupant to sit on as well as other components such as an accelerator pedal (not illustrated in the drawings).

As illustrated in FIG. 2, the utility vehicle includes, as components of the motive power system, an internal combustion engine 30 such as a gasoline engine or a diesel engine (hereinafter referred to simply as "engine 30") and a transmission device 31 configured to vary the output of the engine 30 and transmit the varied output to the front wheels 11 and the rear wheels 12. The transmission device 31 is structured as conventional and is not detailed here. The transmission device 31 is configured to vary the output of the engine 30 at any of different change gear ratios in response to an operation of the shift lever 22. The transmission device 31 outputs motive power to the rear wheels 12 via a rear-wheel differential mechanism 32 and to the front wheels 11 via a propeller shaft 33 and a front-wheel differential mechanism 34.

The utility vehicle includes an in-vehicle fuel tank device 5 (hereinafter referred to simply as "fuel tank 5") lateral to the engine 30. The engine 30 and the fuel tank 5 are connected to each other through a fuel supply path 4, and are below a position near the boundary between the driver's seat 23 and the carrier box 14. The fuel tank 5 contains fuel, and is configured to supply its fuel through the fuel supply path 4 to a fuel injection device or an injector (not illustrated in the drawings). The fuel injection device injects the fuel into an air-intake path of the engine 30 to be supplied into a combustion chamber inside a cylinder of the engine 30.

Figure 3:
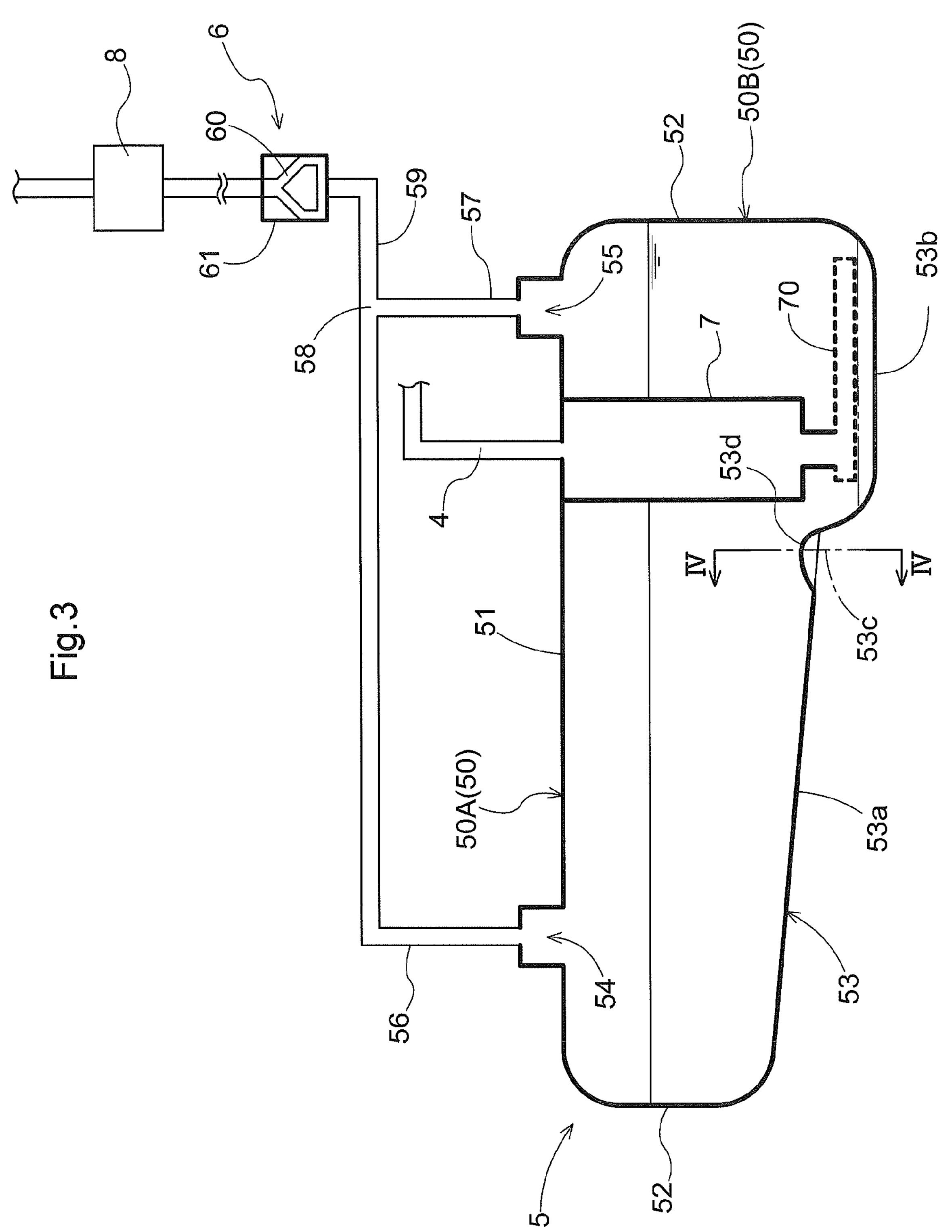
FIG. 3 is a schematic cross-sectional view of an in-vehicle fuel tank device from a lateral side of the vehicle body.

FIG. 3 is a schematic cross-sectional view of the fuel tank 5. The fuel tank 5 includes a tank body 50, a fuel pump 7, and a cutoff valve unit 6. The tank body 50 is in the form of a box including a top portion 51, a side portion 52, and a bottom portion 53 and configured to contain fuel. The tank body 50 includes a main tank section 50A and a sub tank section 50B. The main tank section 50A is made up of the top portion 51, a major part of the side portion 52, and a major part of the bottom portion 53. The sub tank section 50B is made up of a lower back part of the side portion 52 and a back part of the bottom portion 53.

The top portion 51 has a first opening 54 and a second opening 55 each serving as a breather. The fuel tank 5 includes a first pipe 56 connected to the first opening 54, a second pipe 57 connected to the second opening 55, a merge section 58 connected to the first and second pipes 56 and 57, and a merge pipe 59 extending from the merge section 58 to a canister 8 and provided with the cutoff valve unit 6 fitted therein. The cutoff valve unit 6 includes an adapter 61 and a cutoff valve 60. The adapter 61 is in the form of a pipe fitted in the merge pipe 59 to serve as a portion thereof. The cutoff valve 60 is attachable to and detachable from the adapter 61 or from the merge pipe 59 together with the adapter 61. The cutoff valve 60 functions as a common cutoff valve for both the first and second pipes 56 and 57, that is, for both the first and second openings 54 and 55. The first and second openings 54 and 55 are near the front and back ends, respectively, of the top portion 51 in the travel direction. The first and second openings 54 and 55 are thus apart from each other far enough to help prevent fuel from flowing out in response to the body 10 becoming inclined or rolling over. The fuel supply path 4 extends through a portion of the top portion 51 (that is, a fuel supply connection port) which portion is between the first and second openings 54 and 55 and close to the second opening 55.

The bottom portion 53 includes a first area **53*a* and a second area 53*b* that are on the front and back sides, respectively, in the travel direction. The first area 53*a* at least partially has an inclined surface (specifically, with a front portion lifted relative to a back portion). The second area 53*b*** is at least partially so depressed as to receive and store fuel having flown along the inclined surface.

The depressed area serves as the sub tank section 50B. The sub tank section 50B, in other words, includes an open upper portion in communication with the main tank section 50A, and receives and stores fuel having flown along the inclined surface of the first area **53*a***.

The sub tank section 50B is provided with a suction filter 70 serving as a suction port for the fuel pump 7. The suction filter 70 is a planar filter substantially parallel and proximate to the flat bottom surface of the sub tank section 50B.

Figure 4:
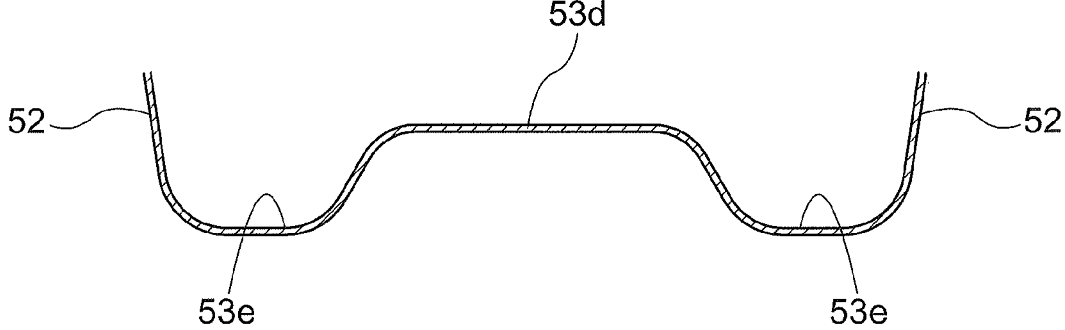
FIG. 4 is a cross-sectional view taken along line IV-IV in FIG. 3, illustrating the contour of a barrier.

FIG. 4 shows the contour of the cross section taken along line IV-IV in FIG. 3. As is clear from FIGS. 3 and 4, the first and second areas **53*a* and 53*b* border on each other in a boundary area 53*c* at least a portion of which is a curved barrier 53*d* protruding upward from the inclined surface in the boundary area 53*c* and extending in the transverse direction of the body to inhibit fuel from flowing from the sub tank section 50B into the first area 53*a***.

Further, as is clear from FIG. 4, the boundary area **53*c* includes flat portions 53*e* disposed between the opposite ends of the barrier 53*d* and the side portion 52 of the tank body 50 and configured to facilitate fuel flowing along the inclined surface of the first area 53*a* into the sub tank section 50**B.

Alternative Embodiments (1) The embodiment described above is configured such that the merge pipe 59 has an end connected to the canister 8. The merge pipe 59 may alternatively have an end directly exposed to the outside.

(2) The embodiment described above is configured such that the barrier 53*d* is formed by curving a part of the bottom portion 53 in such a manner that the part is continuous with other portions. The barrier 53*d* may alternatively be a separate member bonded, welded, or otherwise joined to the bottom portion 53 to be integral therewith.

(3) The embodiment described above is configured such that the top portion 51 has two openings each serving as a breather. The top portion 51 may alternatively have three or more openings. The fuel tank 5 may, in this case, include two or more merge sections 58 and cutoff valves 60, but fewer merge sections 58 and cutoff valves 60 than the openings for cost reduction.

(4) The embodiment described above is configured such that the fuel pump 7 includes a body inside the fuel tank 5. The fuel pump 7 may alternatively be outside the fuel tank 5. The fuel pump 7 is, in this case, connected to the suction filter 70 inside the sub tank section 50B through a suction pipe extending through the fuel tank 5.

(5) The embodiment described above is configured such that the fuel tank 5 is proximate to the engine 30. The fuel tank 5 may alternatively be far from the engine 30: It may be at any position such as a front or back portion of the body 10.

(6) The embodiment described above is a utility vehicle including a fuel tank 5 as an embodiment of the present invention. Examples of the utility vehicle include an all-terrain vehicle (ATV), a buggy, an off-road vehicle, an agricultural work vehicle, and a construction vehicle. The fuel tank 5 as an embodiment of the present invention is, of course, mountable in any other vehicle including an internal combustion engine.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

INDUSTRIAL APPLICABILITY

The in-vehicle fuel tank device according to an embodiment of the present invention is mountable in any of various vehicles that use liquid fuel such as gasoline.

REFERENCE SIGNS LIST

1 Front wheel
2 Rear wheel
3 Driver section
4 Fuel supply path
5 Fuel tank
6 Cutoff valve unit
7 Fuel pump
8 Canister
36 Fuel supply path
50 Tank body
50A Main tank
50B Sub tank
51 Top portion
52 Side portion
53 Bottom portion

53*a* First area
53*b* Second area
53*c* Boundary area
53*d* Barrier
53*e* Flat portion
54 First opening
55 Second opening
56 First pipe
57 Second pipe
58 Merge section
59 Merge pipe
60 Cutoff valve (common cutoff valve)
61 Adapter
70 Suction filter

The invention claimed is:

1. An in-vehicle fuel tank device, comprising:
a main tank comprising a top portion, a side portion, a bottom portion, a main tank section, and a sub tank in a form of an upwardly open depression;
a first opening and a second opening each disposed in the top portion and serving as a breather;
a first pipe connected to the first opening;
a second pipe connected to the second opening;
a merge section at which the first pipe and the second pipe merge with each other;
a merge pipe connected to the merge section; and
a common cutoff valve on the merge pipe,
wherein the main tank section is defined by the top portion, at least a portion of the side portion, and at least a portion of the bottom portion,
wherein the sub tank is defined by the bottom portion, and
wherein a boundary area between the main tank section and the sub tank defines a curved barrier configured to inhibit fuel from flowing along the bottom portion from the sub tank into the main tank section,
wherein the boundary area further defines at least one flat portion disposed along the curved barrier, and
wherein the at least one flat portion connects the at least a portion of the bottom portion that defines the main tank section and the bottom portion that defines the sub tank section to facilitate fuel flow from the main tank section to the sub tank.

2. The in-vehicle fuel tank device according to claim 1, further comprising:
an adapter that allows the common cutoff valve to be independently attached to and detached from the merge pipe.

3. The in-vehicle fuel tank device according to claim 1, further comprising:
a canister connected to the merge pipe.

4. The in-vehicle fuel tank device according to claim 1, wherein:
the merge pipe has an end exposed to outside.

5. The in-vehicle fuel tank device according to claim 1, further comprising:
a fuel pump configured to supply fuel to an engine,
wherein the fuel pump has a suction port in the sub tank.

6. A utility vehicle comprising an in-vehicle fuel tank device according to claim 1.

7. The in-vehicle fuel tank device according to claim 1, wherein the at least one flat portion comprises a pair of flat portions disposed on opposing ends of the curved barrier of the boundary area.

8. The in-vehicle fuel tank device according to claim 1, wherein the bottom portion of the main tank comprises a first area and a second area, wherein the main tank section is defined by the first area, and the sub tank is defined by the second area, wherein the second area is depressed relative to the first area, and wherein the at least one flat portion connects the first area to the second area.

9. The in-vehicle fuel tank device according to claim 8, wherein the first area comprises an at least partially inclined surface, and wherein the flat portion connects the at least partially inclined surface to the second area.

10. The in-vehicle fuel tank device according to claim 9, wherein the at least one flat portion comprises a pair of flat portions disposed on opposing ends of the curved barrier of the boundary area.

* * * * *